Nov. 5, 1968  F. SINGER  3,408,910
SETTING DEVICE FOR PHOTOGRAPHIC EQUIPMENT
Filed April , 1965
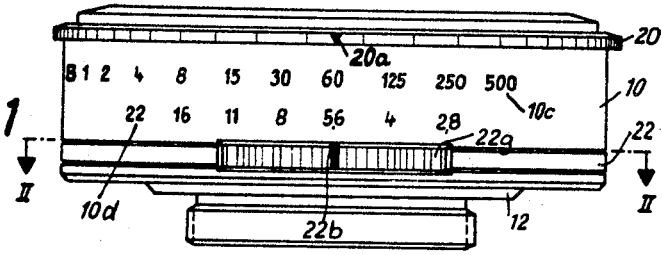
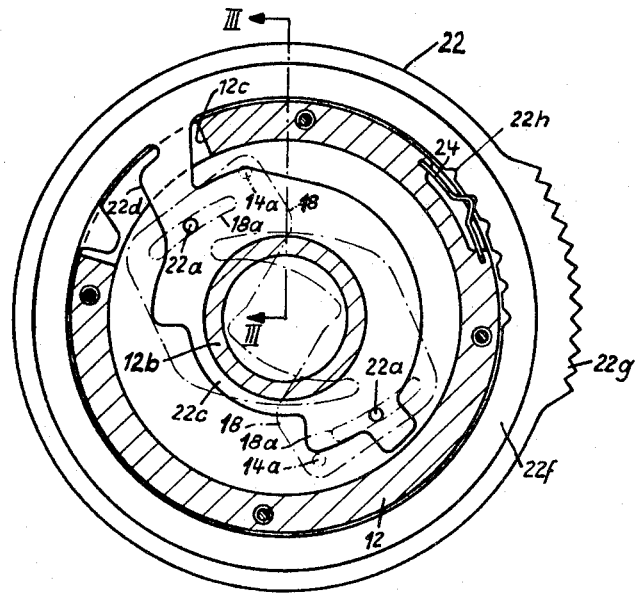
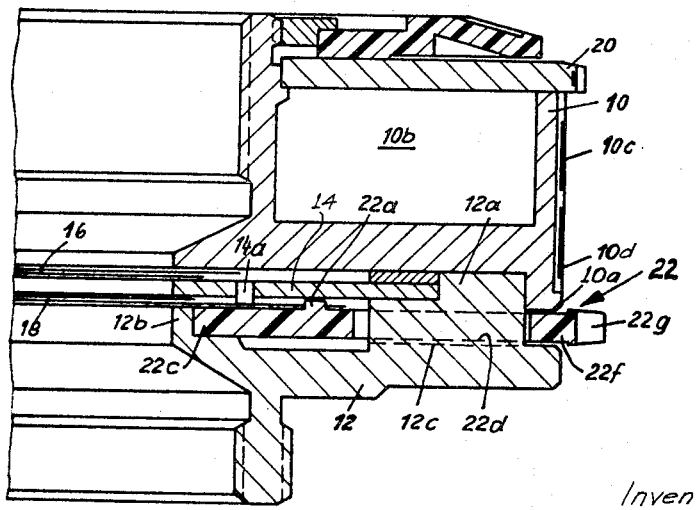
Inventor
Franz Singer
Larson and Taylor
Attorneys

United States Patent Office 3,408,910
Patented Nov. 5, 1968

3,408,910
SETTING DEVICE FOR PHOTOGRAPHIC
EQUIPMENT
Franz Singer, Munich, Germany, assignor to Compur-Werk Gesellschaft mit beschrankter Haftung & Co., Munich, Germany, a corporation of Germany
Filed Apr. 2, 1965, Ser. No. 445,212
Claims priority, application Germany, Apr. 8, 1964,
C 32,596
1 Claim. (Cl. 95—64)

ABSTRACT OF THE DISCLOSURE

A setting member for an iris diaphragm of a camera. The setting member is formed by an inner ring carrying the iris diaphragm adjusting mechanism, and an outer ring which is provided with a grip to enable the operator to turn the setting member. The outer ring is also provided with notches which cooperate with a releasable coupling to permit retention of the setting member in selective positions.

The present invention relates to a setting means for a camera mechanism, i.e. an iris diaphragm, and more particularly to a setting member which is of simple construction and is adapted to be manufactured by mass production techniques.

According to the present invention there is provided a setting means including an inner ring carrying the mechanism operating means and an outer ring which is provided with grip means. The inner ring is disposed within the mechanism housing and the outer ring is disposed outside the housing and provided with a resilient web or crosspiece interconnecting the inner and outer rings, the web extending through an opening in the housing. At least one of the two rings is in engagement with a cylindrical guide surface on one of the housing parts.

The setting member comprising the inner ring, web and outer ring may be integrally formed, preferably of a thermoplastic self-lubricating synthetic material. In order to retain the setting member in a preselected position, a plurality of notches may be provided on the inner face of the outer ring, these notches adapted to cooperate with a catch spring mounted in the housing.

An object of the present invention is to provide a setting means which is of simple one piece construction and which may be moulded by mass production methods.

Another object of the present invention is to provide a setting means comprising an inner ring, an outer ring with a web or crosspiece interconnecting the inner and outer rings and integrally formed therewith.

Other objects and many of the attendant advantages of the present invention will become more readily apparent upon consideration of the following detailed specification in connection with the accompanying drawing wherein:

FIG. 1 is a side elevational view of a shutter provided with an iris diaphragm,

FIG. 2 is a cross section on the line II—II of FIG. 1, and

FIG. 3 is a longitudinal section on the line III—III of FIG. 2 on an enlarged scale.

There are provided two housing parts 10 and 12 which are connected together by means of screws (not shown). The housing part 10 is provided with a front objective tube and has a circumferential flange 10a forming a central recessed portion. The housing part 12 has an outer cylindrical collar 12a which has a sung fit within the central recessed portion of the part 10. Housing part 12 carries the rear objective tube and has an inner cylindrical collar 12b. It can be seen in FIG. 3 that the circumferential flange 10a of part 10 is received within an external recess 12a formed in part 12. A plate 14, is disposed between the two housing parts and is held in the correct angular disposition by means which have not been shown. On opposite sides of plate 14 are two cylindrical areas in which are housed, on the one side two shutter blades 16 and, on the other side, two diaphragm blades 18. The shutter blades 16 are operated to open and close the shutter aperture by driving means which are of well known construction and therefore have not been illustrated, these being disposed within the annular space 10b of the shutter housing 10. A time setter 20 is used to adjust the desired exposure period, the mark 20a thereof (FIG. 1) cooperating with an exposure time scale 10c arranged at the periphery of the shutter housing 10.

Each diaphragm blade 18 is pivotally mounted on the plate 14 by a pin 14a and has an operating slot 18a in which an operating pin 22a of a diaphragm setting means 22, engages. When the diaphragm setting means is turned, the diaphragm blades are pivoted about pins 14a to define the desired diaphragm aperture. The then-prevailing diaphragm value can be read on a diaphragm scale 10d (FIG. 1) on the periphery of the shutter housing, using a mark 22b on the diaphragm setting means.

In accordance with the invention, the diaphragm setting means 22 comprises an inner ring 22c which carries the operating pins 22a and is coupled through a thin web or crosspiece 22d, which is resilient within predetermined limits, to an outer ring 22f which has a few grip notches 22g at the periphery and carries the setting mark 22b. The inner ring 22c is guided on the cylindrical guide tube or collar 12b of the housing part 12, while the crosspiece 22d passes through an opening 12c in the housing part 12 to connect with the outer ring 22f which is disposed externally of the shutter housing. In this way the outer ring 22f is arranged for free movement externally of the shutter in the recess between the two housing parts 10 and 12, but is coupled for rotary movement with the inner ring 22c through the resilient web or crosspiece 22d.

The diaphragm setting means, comprising the parts 22c, 22d, 22f, together with the operating pins 22a, is mass produced as an integral element by injection moulding from a thermo-plastic material, and is moulded to the desired final shape and size so that no finishing is required at any part of the setting means according to the present invention. The fact that a self-lubricating material is used as the thermo-plastic eliminates the need for any lubrication of the setting at its running surfaces.

To retain the setting means 22 in any selected adjusted position, a few detent notches 22h are provided on the inner surface of the outer ring 22f, these co-operating with a catch spring 24 mounted in the outer cylindrical surface of housing part 12, comprising collar 12a.

In addition it should be stated, that, if need be, the outer grip ring of the setting means might be connected to the inner ring through two crosspieces, and/or the outer ring may be guided against a cylindrical guide surface of one of the housing parts. Finally, also the time setter 20 of the camera shutter may be made, in case of need, in the inventive manner as an inner ring and an outer ring interconnected by a resilient web or crosspiece to form a sole setting member for the time setting mechanism arranged within the camera shutter.

I claim:
1. A setting device for a camera comprising a pair of cylindrical housing parts, an inner cylindrical collar and an external recess on one of said housing parts, a circumferential flange on the other housing part adapted to be disposed in a portion of the recess when the housing parts are fitted together, an outer ring rotatable on an outer cylindrical surface of the one housing part and disposed in the external recess therein, a plate disposed between the housing parts, first pins on said plate, a pair of diaphragm blades pivotally mounted on said first pins, an inner ring disposed within the one housing part and rotatable on the inner cylindrical collar thereon, second pins on said inner ring, slots in the diaphragm blades, said second pins engageable in the slots, a web interconnecting and integrally formed with the inner and outer rings, the web extending through an opening in the one housing part, finger grip means on the outer ring, and releasable means for retaining the outer ring in selective positions.

References Cited

UNITED STATES PATENTS

| 1,676,595 | 7/1928 | Wittel | 95—64 XR |
| 3,108,528 | 10/1963 | Rentschler | 95—64 |
| 3,132,576 | 5/1964 | Mahn | 95—64 |
| 3,196,771 | 7/1965 | Kiper | 95—64 |

FOREIGN PATENTS

| 231,263 | 1/1964 | Austria. |

NORTON ANSHER, *Primary Examiner.*

J. F. PETERS, *Assistant Examiner.*